United States Patent [19]

Savoca

[11] Patent Number: 5,257,760
[45] Date of Patent: Nov. 2, 1993

[54] SCANNING EARTH SENSOR USING THE SUN'S POSITION FOR DETERMINING YAW

[75] Inventor: Robert C. Savoca, Ridgefield, Conn.

[73] Assignee: EDO Corporation, Barnes Engineering Division, Shelton, Conn.

[21] Appl. No.: 903,149

[22] Filed: Jun. 24, 1992

[51] Int. Cl.⁵ .............................. B64G 1/36
[52] U.S. Cl. ................... 244/171; 244/164; 250/206.1; 364/459
[58] Field of Search .............. 244/171, 164; 250/206.1, 206.2, 203.1; 342/352, 357, 358; 364/455, 456, 459

[56] References Cited

U.S. PATENT DOCUMENTS

| | | | |
|---|---|---|---|
| 3,337,160 | 8/1967 | Eckermann, Jr. | 244/171 |
| 3,521,835 | 7/1970 | Braga-Illa et al. | 244/171 |
| 4,827,422 | 5/1989 | Savoca | 364/459 |
| 5,048,774 | 9/1991 | Savoca | 244/171 |
| 5,062,051 | 10/1991 | Sainct et al. | 244/171 X |
| 5,080,307 | 1/1992 | Smay et al. | 244/164 |
| 5,142,150 | 8/1992 | Sparvieri et al. | 244/171 X |

Primary Examiner—Joseph F. Peters, Jr.
Assistant Examiner—Christopher P. Ellis
Attorney, Agent, or Firm—Parmelee, Bollinger & Bramblett

[57] ABSTRACT

A scanning sensor having a radiation detector is mounted on a spacecraft or satellite orbiting the earth. The scanner is pointed in such a way with respect to the orbit plane of the satellite that the instantaneous field of view of the detector crosses the region between the lower and upper limits of the travel of a celestial body in a year in order for the radiation detector of the earth sensor to encounter the celestial body at least once per orbit. Electrical signals based on the horizon crossing and the presence of a celestial body in the field of view of the detector are generated and used to derive Yaw, Pitch and Roll attitude information for the satellite with respect to the earth.

2 Claims, 2 Drawing Sheets

SCANNING EARTH SENSOR USING THE SUN'S POSITION FOR DETERMINING YAW

BACKGROUND OF THE INVENTION

This invention relates to the method of using an earth sensor on a satellite or spacecraft for providing three axes attitude information for the orbiting satellite or spacecraft using the earth and another celestial body.

Unmanned earth orbiting satellites generally employ earth sensors which are mounted therein and used for attitude control and guidance of the orbiting satellite. The attitude of the satellite is determined by its position with respect to three axes at right angles to each other. Two of these axes are in a plane at right angles to a projected radius of the earth passing through the satellite and the third axis coincides with such radius. The plane in which the first two axes lie is parallel to the earth's horizon and once the orientation of the satellite with respect to these two axes is determined, orientation around the other axis can be determined using other means such as dedicated sun-sensors, star-trackers, magnetometers, or other such equipment for observations of other heavenly bodies, or physical phenomena.

Earth sensors utilize a line of thermal discontinuity between the earth's atmosphere and outer space, which is characterized by a large differential in infrared radiation between outer space and the earth which is considerably warmer. This characteristic is utilized in one embodiment on the invention by scanning an infrared detector in a conical scan pattern across the horizon and deriving electrical output signals marking the line of thermal discontinuity. Reference pulses are also generated as the scan passes through predetermined points in the vehicle. The intervals between crossings and the reference pulses are compared to produce an output signal, which produces information with respect to the attitude of the vehicle with respect to the earth which it orbits.

Earth sensors generally treat the sun or other celestial bodies as unwelcome intrusions into the process of measuring spacecraft attitude. Generally, the sun is identified by its small angular size and its high intensity, which is rejected. Some horizon sensors actually provide sun sensors for detecting the sun in order to eliminate the sun or other celestial bodies from the attitude measuring process.

Other celestial bodies may be used for providing attitude information but again may require additional sensors, which are specifically directed at the celestial body to be utilized. One of the problems in using a single sensor is that the angular subtense of such celestial objects may be so small that in using a fixed scan circle, the celestial body may be missed on any given scan. Unless the object is intercepted repetitively by a particular scan pattern, the accuracy and/or reliability of the attitude measurement cannot be maintained.

SUMMARY OF THE INVENTION

Accordingly, it is an object of the present invention to provide a new and improved method of obtaining a high accuracy attitude information using a single earth sensor to provide accurate three axes information, using the earth in conjunction with an additional celestial body such as the sun.

Another object of this invention is to provide a new and improved method of utilizing an earth sensor, which provides the capability of periodic Yaw sensing.

In carrying out this invention in one illustrative embodiment thereof, a method of providing three axes attitude information for a satellite orbiting the earth from a single earth sensor which detects and uses another celestial body such as the sun or moon to provide Yaw axis information is provided by mounting the earth sensor having a conical scanner for directing radiation from a field of view onto a radiation detector of the orbiting satellite. The conical scanner is pointed at an angle less than 90 degrees with respect to the orbit plane of the satellite such that the instantaneous field of view of the radiation detector crosses the region between the upper and lower limits of the travel of the celestial body in a year in order for the radiation detector to encounter the celestial body at least once per orbit. Signals are generated on the occurrence of the horizon crossings and the presence of the celestial body in the field of view of the detector, which signals are used for deriving Pitch, Yaw and Roll attitude information for the satellite with respect to the earth. Other means, such as gyroscopes, can be used to provide Yaw for times between the periodic, accurate Yaw determinations of the sensor.

One of the advantages of the present invention is the elimination of various means for discriminating against other celestial bodies in deriving the attitude information. In addition, accurate Yaw information is provided by using the same earth sensor which sees a celestial body of reference at least once in each orbit and uses that reference to provide additional attitude information.

BRIEF DESCRIPTION OF THE DRAWINGS

The invention, together with further objects, aspects, features and advantages thereof will be more clearly understood from the following description taken in connection with the accompanying drawings.

DESCRIPTION OF THE PREFERRED EMBODIMENTS

The principles of the present invention are applicable to orbits above the earth from 200 nautical miles to geosynchronous altitudes of 22,000 miles and beyond. Although the invention is described in connection with the sun being the celestial body, other celestial bodies such as the moon may also be used, depending on the orbit and the application. Also, though the earth is described as the body about which the satellite or spacecraft is orbiting, any other planet or moon could be the orbited body. Likewise, although infrared detectors are normally preferred and are described in connection with the present application, it will be appreciated for certain applications that other radiation-type detectors may be utilized.

Figure 1:
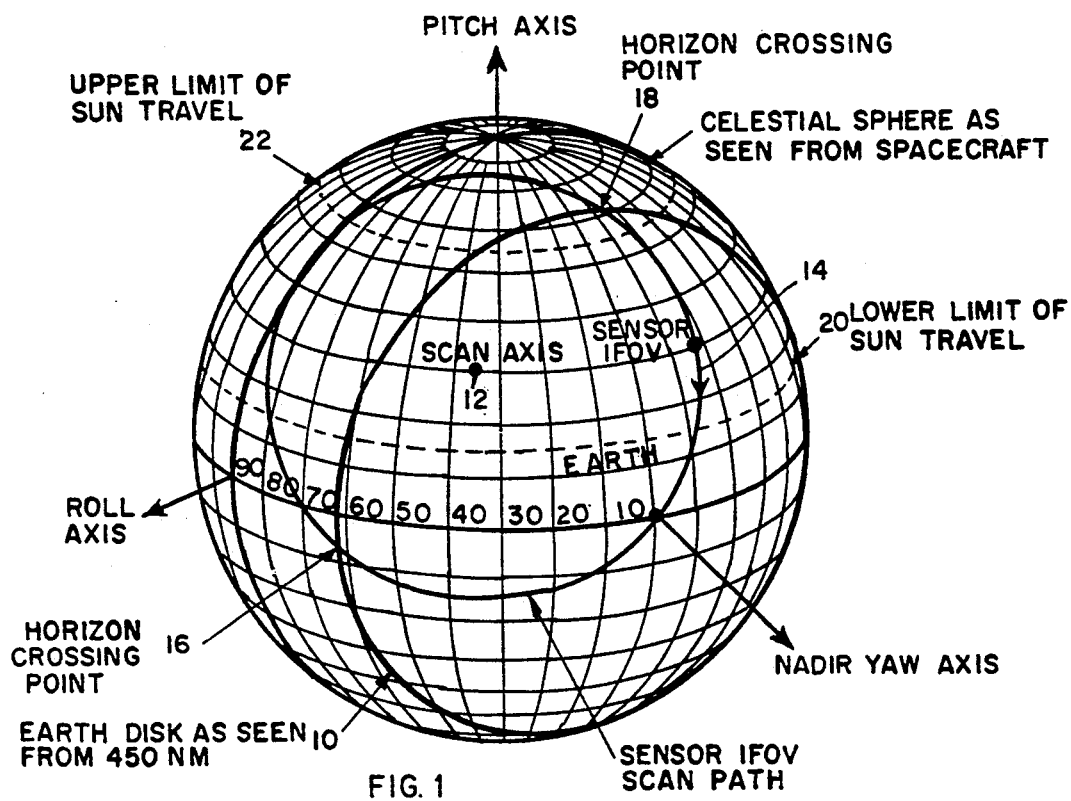
FIG. 1 is a celestial sphere diagram illustrating the sky as seen from an example satellite orbiting the earth, and illustrating the scan path of the field of view of the detector as it intersects the earth's disk.

Referring now to FIG. 1, the celestial sphere diagram illustrates the earth disk 10 as viewed by an earth sensor from 450 nautical miles. An earth sensor (not shown) having a scan axis 12 provides a sensor instant field of view (IFOV) 14. The sensor's instantaneous field of view 14 crosses the earth disk 10 at horizon crossing points 16 and 18. In addition, the sensor IFOV 14 scans across the celestial sphere covering elevations from minus 15 degrees to plus 75 degrees, thereby crossing the lower limit 20 and the upper limit 22 of sun's travel. The Pitch, Roll and Yaw axes are indicated.

Figure 3:
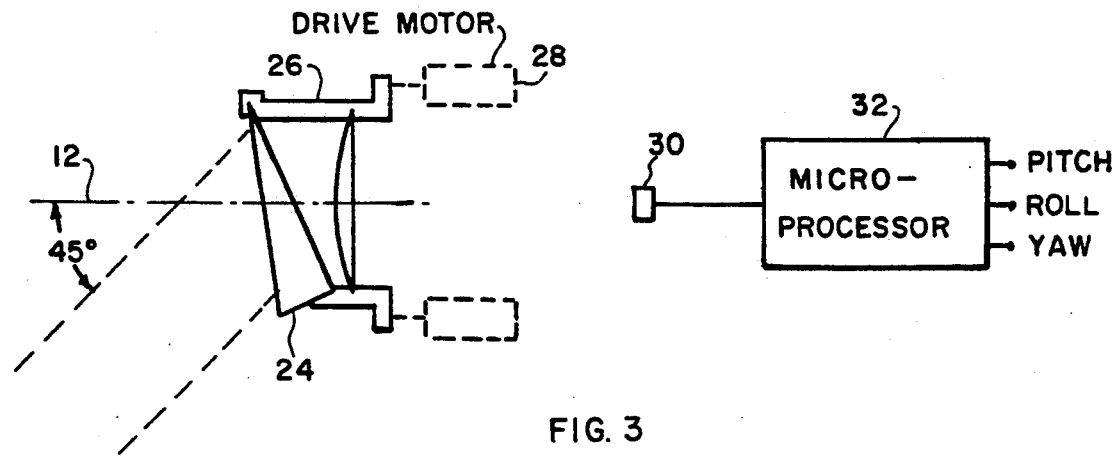
FIG. 3 illustrates one form of conical scanner, which may be utilized in the present invention.

FIG. 3 illustrates, in diagrammatic form the type of conical scan horizon sensor which produces the scan pattern, as illustrated in FIG. 1. For example, Model 13-104 manufactured by Barnes Engineering Co. may be used. A rotating prism 24 mounted in a holder 26 is driven by a drive motor 28. The scanning prism 24, which may be a mirror, has a 45 degree cone angle with the scan axis 12. A radiation detector 30 is mounted on the scan axis 12 for receiving radiation from the rotating prism 24. Signals generated by the radiation detector 30 are applied to a microprocessor 32 which outputs Pitch, Roll and Yaw measurements.

Figure 2:
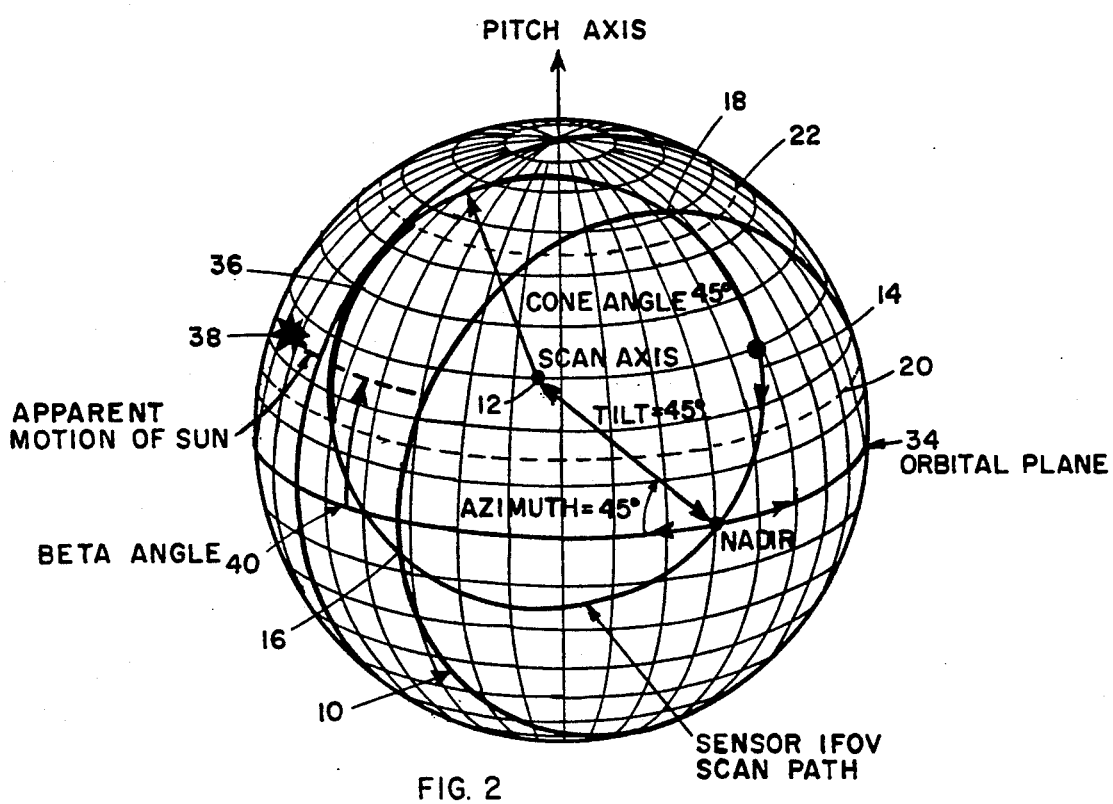
FIG. 2 is also a celestial sphere diagram for a particular case illustrating the apparent motion of the sun, as well as the scanning angles of the scanner mounted on the orbiting spacecraft.

FIG. 2 adds the geometry, illustrating the sensor IFOV 14, which is obtained using a 45 degree half angle scan cone tilted 45 degrees with respect to the nadir pointing direction of the satellite and at 45 degree azimuth with respect to the orbital plane 34. The darkened arc 36, which extends between the lower and upper limit, 20 and 22 respectively, of sun travel indicates where the scan path 14 intersects the sun 38 once per orbit. In the orbit depicted in FIGS. 1 and 2, the sun will range in elevation from the orbital plane 34 from about 15 to 55 degrees, which is referred to as the Beta Angle. Accordingly, once per orbit, the sun will cross the path of the instant field of view 14 of the radiation detector 30.

Figure 4:
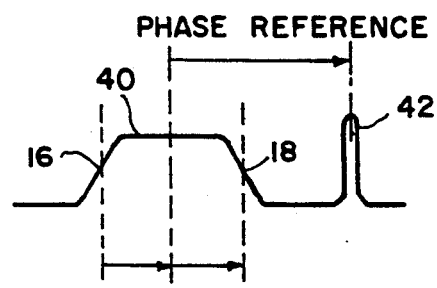
FIG. 4 shows the electrical signals generated by the radiation detector of the earth sensor illustrated in FIG. 3, scanned over a field of view illustrated in FIG. 2, which signals are utilized to provide three axes information from the microprocessor shown in FIG. 3.

The instant field of view 14, as seen from the radiation detector 30, generates representative signals, as shown in FIG. 4. The signal 40 is an earth pulse created as the detector 30 scans horizon crossing points 16 and 18 while the pulse 42 is generated by the detector 30 seeing the sun once per orbit. The Pitch and Roll of the spacecraft can be determined from the leading and trailing edge crossing measurements of the earth produced by the sensor 30. The phases of these signals are compared with a phase reference generated in the horizon sensor. By knowing the Beta Angle of the sun for the orbit shown, compared with the Beta Angles being stored in ephemeris data stored in the microprocessor 32, as well as the phase angle of the sun pulse, data is provided for precise Yaw calculation. Measurements of the sun's position, which are stored in the microprocessor, are made approximately 90 degrees from nadir as shown in FIG. 2, enhancing the Yaw measurement sensitivity. As an added feature, if a real time clock is available on the spacecraft, the time at which the sun passes through the path of the instant field of view 14 provides an independent determination of the sensor pitch.

As will be seen in FIG. 2, the dotted circles 20 and 22, which occur at 15 degrees and 55 degrees, respectively to one side of the orbit plane 34, represent the lower and upper limits of the transit of the sun over a yearly period. On each orbit, the sun 38 will appear to travel in a circle somewhere between these extremes, depending upon the time of year. This is defined as the Beta Angle 40 or the angle between the sun 38 and the orbit plane 34 at any given moment. As pointed out, the sun will be intercepted by the instantaneous field of view 14 of the sensor along the arc 36. The sun moves very slowly and subtends only 0.5 degrees in the sky, while the sensor's field of view is 2.5 degrees, so that the encounter times are long. When the encounter times occur, the detector 30 generates the sun pulse 42, which provides the desired phase measurement.

Figure 5:
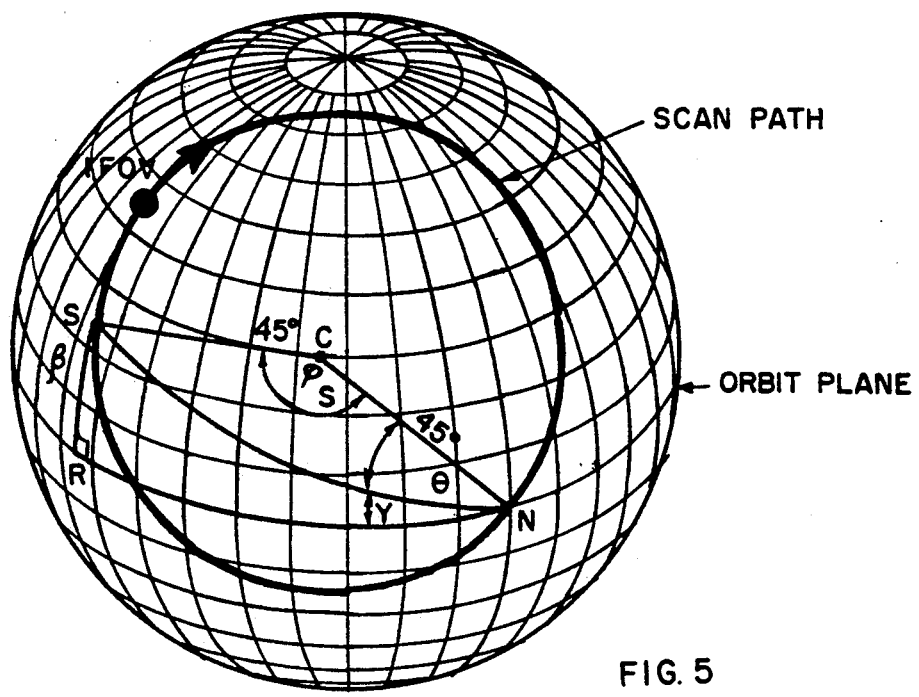
FIG. 5 illustrates, on a celestial sphere, the geometry of the Yaw determination using an earth sensor in accordance with the present invention.

Thus, knowing the Beta Angle and having the phase angle of the sun pulse 42, by using the diagram illustrated in FIG. 5, the Yaw measurement is derived as follows:

$$SN = \cos^{-1}(\cos^{-1}\tfrac{1}{2} + \tfrac{1}{2}\cos\phi_s)$$

$$\theta = \sin^{-1}\left(\frac{\sin 45° \sin\phi_s}{\sin(S/N)}\right)$$

$$\Psi = \sin^{-1}\left(\frac{\sin\beta}{\sin(SN)}\right)$$

$$YAW = \theta + \Psi - 45°$$

As pointed out above, if a real time clock is available in addition to the ephemeris data, the sun time of passing the scan path of the instant field of view 14 provides an independent determination of the spacecraft Pitch. The time of crossing would be estimated similarly to the phase averaging of all scans in the sun passage. Yaw can be calculated in the spacecraft microprocessor 32, using a series of the sun encounters by the scanning sensor 30 once on each orbit.

Accordingly, a single sensor is utilized to provide high accuracy three axes earth attitude information. Instead of eliminating or having to discriminate against signals generated by celestial bodies such as the sun, such bodies are actually employed to enhance attitude measurements for the satellite or spacecraft. As pointed out, the altitude of the orbit may affect the geometry and accordingly, when the synchronous altitudes at 22,000 miles above the earth are utilized, a a multiple scan pattern will be necessary in order to intercept the celestial body on each orbit. In the embodiment illustrated, this may be accomplished by using a double faceted scanner, which forms an angle of at least 23 degrees with the equator, which constitutes the orbital plane of the satellite. The multiple scan is used to insure that the celestial body in question will be scanned at least once in each orbit.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. The method of providing three axes (Pitch, Roll and Yaw) attitude information for a satellite orbiting the earth or other celestial body from a single horizon sensor which detects scanned horizon crossings and uses another celestial body having upper and lower limits of travel in a year with respect to the earth or celestial body being orbited by said satellite to provide Yaw axis information comprising the steps of:

mounting an earth sensor having a scanner for directing radiation from a field of view onto a radiation detector on said satellite orbiting the earth, pointing the scanner path of the sensor with respect to the orbit plane of the satellite such that the instantaneous field of view of the detector crosses the region between the lower and upper limits of the travel of said another celestial body in a year in order for the radiation detector of the earth sensor to encounter said another celestial body at least once per orbit, generating signals based on horizon crossings and the presence of said another celestial body in the field of view of the detector, and deriving Yaw, Pitch and Roll attitude information for the satellite with respect to the earth using the earth and the celestial body signals generated by the radiation detector of the earth sensor.

2. The method as claimed in claim 1, including the steps of orbiting said horizon sensor at a synchronous altitide, and providing multiple angular parallel scans through the region between the lower and upper limits of the travel of the celestial body during each orbit of the satellite.

* * * * *